Aug. 31, 1937.  C. L. COOK  2,091,432
POTATO PLANTER
Filed July 14, 1934    5 Sheets-Sheet 1

INVENTOR
Curtiss L. Cook
BY Brown, Jackson, Boettcher & Dienner
ATTORNEYS.

Aug. 31, 1937.  C. L. COOK  2,091,432
POTATO PLANTER
Filed July 14, 1934   5 Sheets-Sheet 2

INVENTOR
Curtiss L. Cook
BY Brown, Jackson, Boettcher & Dienner
ATTORNEYS.

Aug. 31, 1937.   C. L. COOK   2,091,432
POTATO PLANTER
Filed July 14, 1934    5 Sheets-Sheet 3

INVENTOR
Curtiss L. Cook
BY Brown, Jackson, Boettcher & Dienner
ATTORNEYS.

Patented Aug. 31, 1937

2,091,432

UNITED STATES PATENT OFFICE 2,091,432

POTATO PLANTER

Curtiss L. Cook, Syracuse, N. Y., assignor to Syracuse Chilled Plow Co., Inc., Syracuse, N. Y., a corporation of New York Application July 14, 1934, Serial No. 735,135

24 Claims. (Cl. 221—133)

The present invention relates generally to agricultural implements and is particularly concerned with potato planters and the like, preferably those embodying a seed bowl in which there is disposed a picker wheel of more or less conventional construction for picking up pieces of potato, one at a time, and dropping the same into a seed receiving furrow. One of the principal objects of the present invention is the provision of a seed hopper disposed substantially directly above the seed bowl in which the picker wheel is operative. This feature, particularly in connection with improved oscillating plates and the like, by which the pieces of potato are continuously and uniformly fed to the seed bowl, provides a very efficient but simple gravity feed by which exactly the right amount of seed is maintained in the bowl for efficient and proper planting and by which a uniform flow of seed pieces into the seed bowl is secured without any bridging of the seed in the hopper or other irregularities in the feed.

Another object of the present invention is the provision of a seed hopper including oscillatory inclined plates forming a wall of the hopper and means for oscillating said plates which is actuated by the picker wheel in the seed bowl.

Another important object of the present invention is the provision of a hopper mounted directly over the seed bowl, which is especially adapted for use with seed bowls of the type embodying separated sections between which the picker is operative. According to the principles of the present invention the lower portion of the hopper includes hopper sections embracing the picker wheel and provided with vertical wall portions disposed adjacent the upper portions of the picker wheel, with oscillating plates movable in a vertical plane and pivotally mounted on the vertical wall portions mentioned. Oscillation of these plates serves to secure uniformity of feed.

A further object of the present invention is the provision of driving means for said oscillating plates which is actuated by the same shaft which drives the picker wheel, and a still further object of the present invention is the provision of oscillating means for the fertilizer hopper which is also driven by this shaft, particularly by connecting means associated with the connections by which the shaft drives the oscillating plates mentioned above.

Still another object of the present invention is the provision of improved means for connecting the beam or beams of the furrow opener with the main frame of the potato planter so as to provide for lateral adjustment of the furrow opener. While this improvement is particularly concerned with an implement such as a potato planter, this feature of the present invention is not necessarily to be limited to potato planters.

A further object of the present invention, having particularly to do with potato planters but not necessarily limited thereto, is the provision of improved connections between the furrow opener which opens a furrow for receiving potato seed and the covering disks or other means, by which the covering means is held to a working depth corresponding to the depth of operation of the furrow opening means. Further, another object of the present invention is the provision of such connections that the furrow opening means and the covering means are both raised to substantially the same height when the implement is arranged for transport, as for turning around at the end of the furrow, moving from field to field, or the like. In this connection, a still further object of the present invention is the provision of improved furrow opening means for the deposition of fertilizer in advance of the opening of the furrow which receives the potato seed pieces. According to the principles of the present invention, the fertilizer furrow opening means is operatively connected with the seed furrow opening means so that, by the employment of a single compression spring or the equivalent, both of the furrow opening means are yieldingly held in operating position and both can accommodate obstructions and the like which may be encountered as the machine is drawn across a field in operation.

Another important object of the present invention is the provision of improved fertilizer distributing means which embodies, first, a straight vertically disposed tube or a pair of tubes for delivering the fertilizer directly into the fertilizer furrow, and, second, the provision of an improved agitator disposed between laterally spaced fertilizer distributing bowls. By virtue of these features, a steady, uniform and accurately controlled deposit of fertilizer can be secured.

A further object of the present invention is the provision of an improved agricultural implement frame means which comprises a frame unit suitably connected together by means which maintains the unit parts rigidly connected together and which, at the same time, provides for the association of a plurality of such units secured together and forming a relatively rigid frame construction for a multiple-row machine.

These and other objects and advantages of the present invention will be apparent to those skilled in the art after a consideration of the following detailed description of the preferred structural embodiment, taken in conjunction with the accompanying drawings illustrating the same.

In the drawings:

Figure 6 is a top plan view, on a reduced scale, of the seed and fertilizer hoppers;

Figures 1, 2:
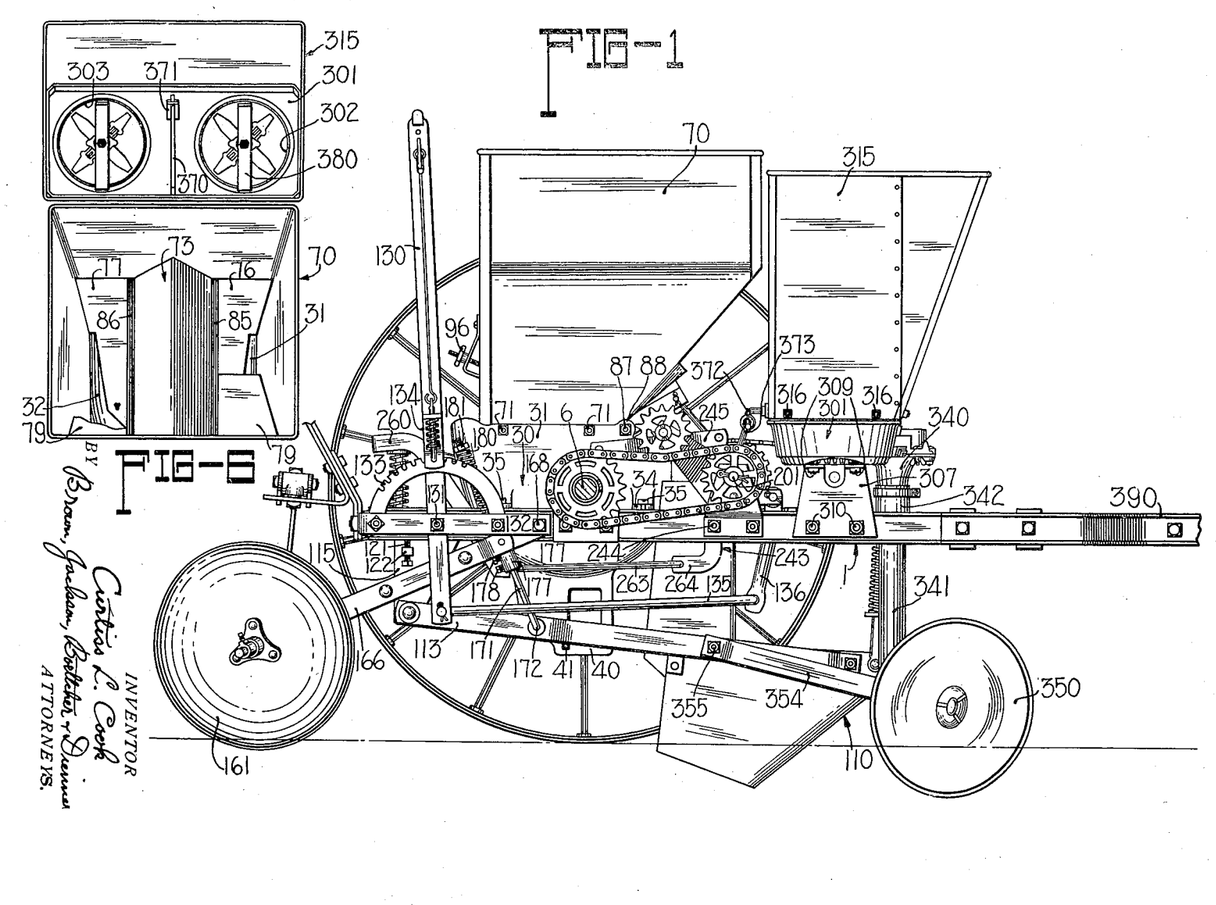
Figure 1 is a side elevation of a potato planter embodying the features of the present invention, the right hand supporting wheel being removed in order to better show the operating parts.
Figure 2 is a top view of the machine shown in Figure 1, with the seed hopper and fertilizer distributing apparatus cut away.
Figure 2:
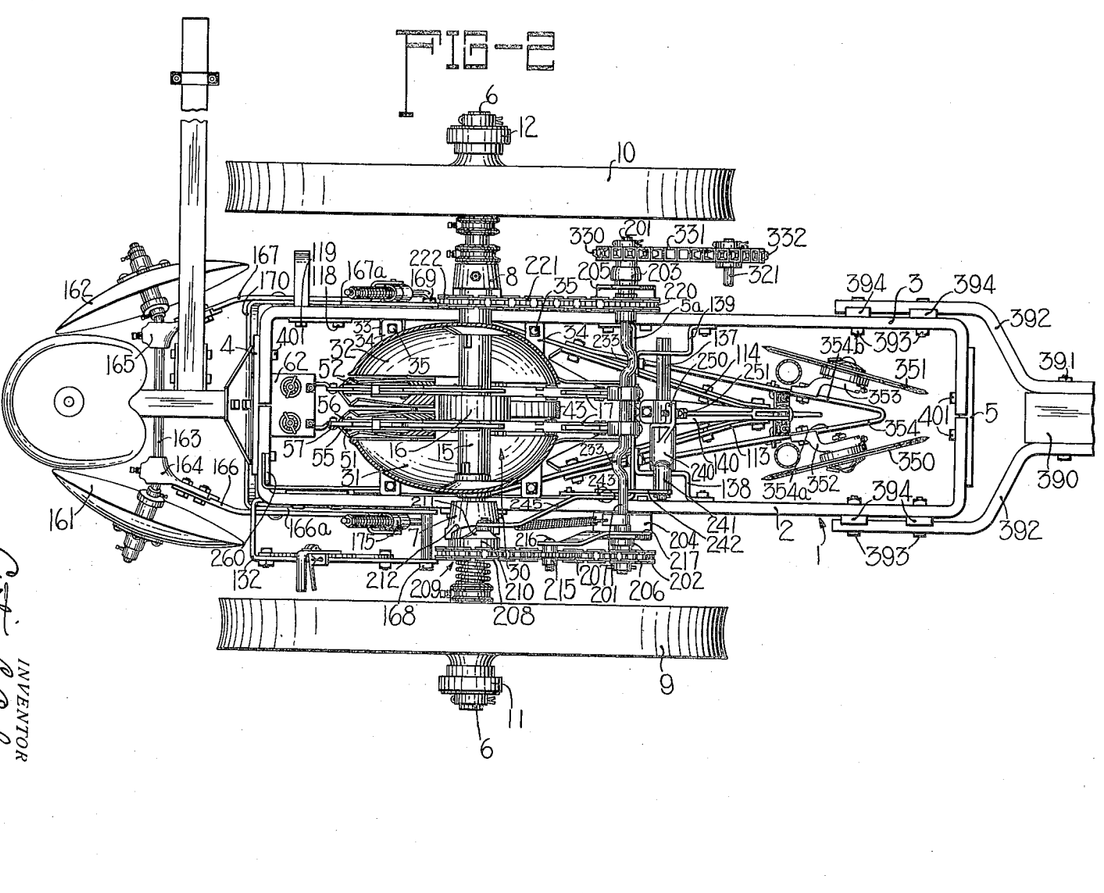

The implement shown in the accompanying drawings is a potato planter and embodies suitable seed selecting mechanism and associated parts mounted on a wheeled supporting frame 1 which comprises two longitudinally extending channel members 2 and 3 having their ends bent at right angles and connected together by means of connecting blocks 4 and 5 disposed, respectively, at the rear and front ends of the implement, as best shown in Figure 2, which illustrates a single unit machine. The function of the connecting blocks 4 and 5 when employing a plurality of frame units to provide a multiple row machine will be referred to later. Intermediate the ends of the channel frame members 2 and 3, there is disposed a transverse frame member 5a which reinforces the frame and serves to connect the members 2 and 3 intermediate their ends. The frame is carried on an axle 6 which is journaled in bearings 7 and 8 (Figure 2) suitably fixed to the two frame members 2 and 3, respectively. The ends of the axle 6 extend laterally outwardly to receive carrying wheels 9 and 10 journaled thereon. The wheels 9 and 10 serve as driving wheels for the machine and, to this end, are equipped with pawl and ratchet drive mechanisms 11 and 12 for operating the various parts of the planter mechanism.

Figure 3:
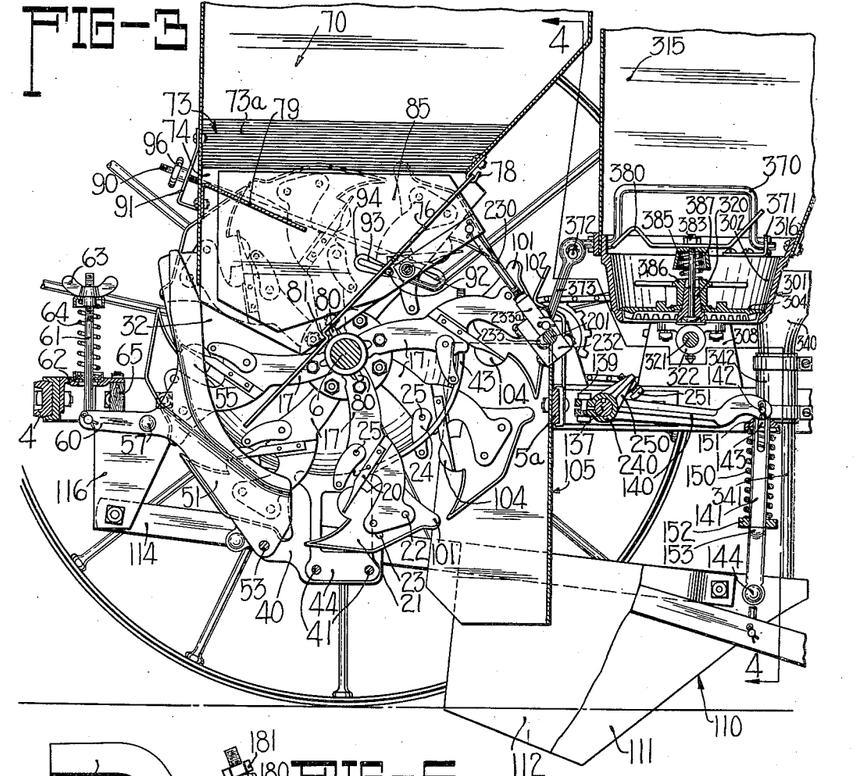
Figure 3 is a vertical longitudinal section taken on an enlarged scale.

The planting mechanism in general comprises a seed hopper, the pieces of potato or the whole potatoes which may be planted being hereinafter referred to as "seed", and suitable seed selecting mechanism for successively selecting pieces of potato and depositing the same in a suitably formed furrow. The planting mechanism consists of a picking element or wheel 14 which comprises a sleeve member 15 journaled on the central portion of the axle 6 and provided with a central hub 16 (Figure 2) to each side of which four radially extending picker arms 17 are fixed, preferably in staggered arrangement, as best indicated in Figure 3. Each of the picker arms has two picker prongs 20 fixed thereto, preferably one on each side thereof, and each pair of prongs is adapted to impale a piece of potato in the manner well known in the art. For ejecting the piece of potato impaled on the prongs, each picker arm is provided with a cam member 21 pivotally connected to the radially outer end of the associated arm, as indicated at 22, and has pivotal movement with respect thereto within the limits of a slot 23 formed in the cam member and which receives a pin or the like carried at the outer end of the arm 17. A gravity controlled retaining member 24 is carried on each of the picker arms 17, the pivot connection being indicated by the reference numeral 25, and the retaining members 24 serve to aid in holding the potato pieces on the picks or prongs 20. Preferably, the cam member 21 on each of the picker arms functions not only to guide the pieces of potato onto the picks or prongs but also to eject the pieces off of the prongs 20 at the proper time, as will be described more in detail below.

Figure 4:
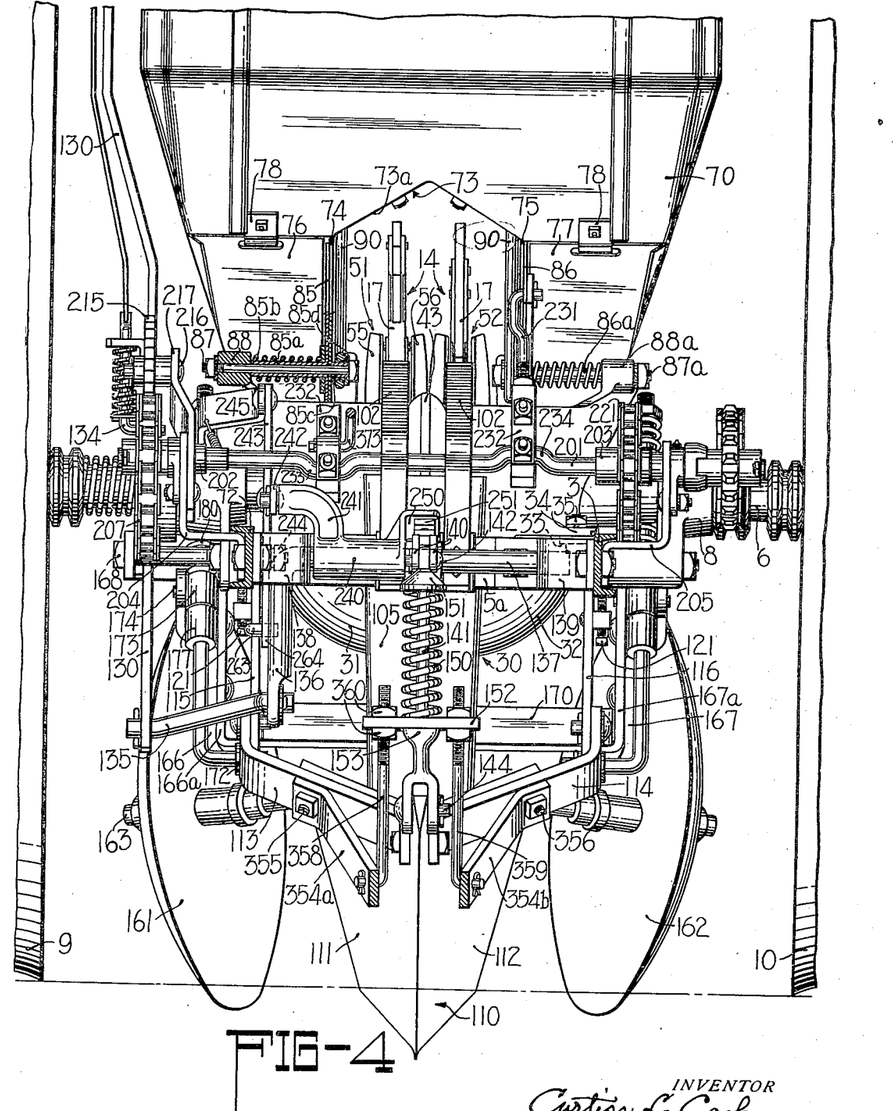
Figure 4 is a section taken along the line 4—4 of Figure 3.

As is usual in this type of implement, the picker wheel 14 and the arms 17 operate within a seed bowl of generally semi-spherical configuration indicated in its entirety by the reference numeral 30. The seed bowl 30 is preferably of two part construction, being formed of two half sections 31 and 32 spaced apart laterally of the implement so as to provide space for the picking arms 17 to pass between the bowl sections and closely adjacent the inner edges thereof. The two half sections 31 and 32 of the seed bowl 30 are separately supported from the frame members 2 and 3, respectively, by means of small brackets 33 which extend laterally inwardly from the frame members 2 and 3 to receive cooperating lugs 34 formed preferably integrally with the bowl sections 31 and 32. The brackets 33 and the lugs 34 are suitably apertured to receive bolts 35 by which the bowl sections 31 and 32 are secured in place. The bowl sections are connected together at their lower sides, and to this end each section is provided with a depending flange 40 (Figure 3), and the flanges are connected together by any suitable means, such as bolts 41. As best shown in Figure 3, the picker arms 17 move through a path which is closely adjacent the connecting bolts 41, and as best shown in Figure 4, the picker arms 17 are spaced apart and the space between the picker arms 17 on one side of the wheel and the other arm at the other side of the wheel is closed by means of a generally vertically disposed filler member 43 (Figure 2) which extends between the arms 17 and is provided at its lower end with a depending arm 44 (Figure 3) disposed between the flanges 40 in the lower central portion of the seed bowl sections 31 and 32. The depending arm 44 is bolted to the flanges 40 by means of the connecting bolts 41 referred to above. The adjacent edges of the seed bowl sections 31 and 32, together with the centrally disposed curved filler member 43, thus form a pair of slots in the seed bowl construction, and these slots receive the picker arms 17, as best shown in Figures 2 and 3.

In the rear portion of the seed bowl 30 in the space between the two bowl sections 31 and 32 at the rear of the filler member 43 described above, there are two concaves 51 and 52 which are pivotally mounted on a bolt 53 disposed in the lower portion of the flanges 40 depending from the bowl sections 31 and 32, as best shown in Figure 3. Each concave comprises two members 55 and 56 connected together by means of a bolt 57 or the equivalent. The connecting bolt 57, by which the two parts of the concave are connected together, passes through a rearwardly extending arm 60 on the concave part 55 and through a similar portion on the other concave part 56, and the inner edges of the two concave members 55 and 56 diverge to form a V-shaped trough for the reception of one row of picker arms 17. For adjusting the tension of the concaves 51 and 52, the arm 60 of each is provided with an opening to receive the lower end of an adjusting bolt 61 which passes through a perforation in a bracket 62 carried by the rear ends of the frame members 2 and 3, as best shown in Figures 2 and 3. An adjusting nut 63 is provided on the upper end of each bolt 61 and a compression spring 64 is disposed between each nut 63 and the bracket 62. By virtue of this construction, the springs 64 yieldingly hold the arms 60 on the concaves 51 and 52 up against a stop block 65 carried by the bracket 62. As the pieces of potato, or potato seed as they are called, are fed into the seed bowl 30, as will be referred to later, they fall upon the concaves, and as the picker arms 17 come in contact with the potato pieces, the latter are pushed upwardly along the concaves and the latter function to push an individual piece of potato onto the two prongs or picks 20 of one of the arms 17.

The seed potatoes or pieces thereof are fed into the seed bowl 30 by means which will now be described. Above the bowl 30 the hopper 70 for the potato seed is mounted, and the hopper is fixed to the outer side of the two bowl sections 31 and 32 by any suitable means, such as bolts 71 or the like. The lower portion of the hopper is divided into two laterally spaced sections by means of an inner partition 73 which embraces the upper portion of the picker wheel and provides a space through which the picker arms 17 move. The partition 73 comprises a V-shaped top 73a and vertically disposed walls 74 and 75 which lie closely alongside the picker wheel unit, as best shown in Figure 4. The front walls of the two lower laterally spaced hopper sections comprise downwardly and rearwardly inclined plates 76 and 77 which are hingedly mounted on brackets 78 (Figures 3 and 4) suitably fixed to the front wall of the upper portion of the hopper 70. On the rear wall of the hopper a baffle plate 79 is fixed and extends forwardly and downwardly, as best shown in Figure 3. The function of the baffle plate 79 in each of the lower hopper sections is to retard the movement of the seed potatoes into the bowl 30.

By reason of the partition 73, the seed pieces of potatoes in the hopper are caused to travel down either on one side or the other of the partition and along one or the other of the inclined plates 76 and 77 and be deposited into the bowl section 31 or 32 adjacent the concaves 51 and 52. In order to facilitate the continuous movement of the seed potatoes into the bowl 30, the inclined plates 76 and 77 are caused to oscillate vertically by means of a pair of lugs 80 (Figures 2 and 3) provided on the picker wheel sleeve 15 on each side of the hub section 16. Each inclined wall 76 and 77 is provided with a shouldered offset 81 adjacent the point of the plate which is contacted by the associated lug 80. This shouldered construction provides for a sudden downward movement of the bottom plates 76 or 77 each time one of the lugs 80 passes the portion 81.

For further facilitating the movement of the potatoes toward the seed bowl and to prevent bridging of the potatoes in the lower sections of the hopper 70, two oscillating plates 85 and 86 are provided, one adjacent each vertical wall 74 and 75 of the partition 73. As best shown in Figure 4, the plate 85 is pivotally mounted on a sleeve 85a carried by a bolt 87 which is fixed to and extends laterally inwardly from a lug 88 formed on the upper front corner of the bowl section 31. The plate 85 is held against the vertical wall 74 by means of a compression spring 85b which embraces the sleeve 85a and bears against the inner side of the lug 88 and against a washer on the sleeve 85a which engages the plate 85. By virtue of this construction, the plate 85 pivots about an axis defined by the bolt 87 and is movable in a vertical plane. The other oscillatable plate 86 is similarly pivoted on a sleeve 86a carried by a bolt 87a extending inwardly from a lug 88a on the upper corner of the bowl section 32. The bolt 87 also provides a support for the lower front corner of the partition wall 74, the bolt 87 passing through a perforation in the wall 74 and carrying a short sleeve 85c which clamps the plate 74, when the bolt 87 is tightened, between the sleeve 85 and the sleeve 85c. That is to say, when the bolt 87 is tightened, the head bears against the short sleeve 85c, and the latter, in turn, bears against the wall 74 which is thus clamped tightly against the sleeve 85a. The latter bears, at its laterally outer end, against the lug 88a, whereby tightening the bolt 87 rigidly secures these parts to the bowl section 31. The other bolt 87a supports the lower corner of the wall 75 in a similar manner, as best shown in Figure 4.

The extent of oscillation of the inclined plates 76 and 77 (Figure 3) is controlled by means of a pair of rods 90 (Figure 4), there being one of such rods for each of the inclined plates. Each of the rods 90 is supported, as best shown in Figure 3, in a perforation in a bracket 91 mounted on the rear wall of the hopper 70 and extended along the outer side of the vertical wall 74 of the partition 73. The forward end of the rod 90 is looped back upon itself and the looped portion embraces the sleeve 85c mounted, as described above, on the bolt 87. A washer 85d (Figure 4) is interposed between the short sleeve 85c and the head of the bolt, the washer serving to hold the rod 90 in position. The looped end of the rod terminates in a laterally extended end 92 which is disposed in a slot 93 formed in the vertical wall 74 of the partition 73. Since the oscillatory plate 85 is disposed against the vertical wall 74, the plate 85 is also provided with a slot 94 to receive the laterally extended end 92 of the rod 90, and since the plate 85 oscillates the slot 94 is necessarily larger than the slot 93 so as to clear the end 92 in the different positions to which the plate may be moved. The end 92 of the rod 90 extends underneath the oscillatory plate 76 and forms a support therefor. A hand screw 96 is threaded on the rear end of the rod 90 and by tightening the same the rod may be moved toward the lug in Figure 3, thereby preventing the plate 76 from being oscillated to as great an extent as would be the case if the end 92 is adjusted to the right of Figure 3 as far as possible. In other words, moving the rod 90 to the left in Figure 3 reduces the amplitude of oscillation of the plate 76. The other rod 90 for the oscillatory plate 77 is similarly mounted on the inner end of the bolt 87a and is likewise provided with a hand screw 96. By turning the hand screws 96 in one direction or the other, the laterally bent ends 92 thereof can be moved forwardly or rearwardly to limit the oscillating movements of the plates 76 and 77 caused by their engagement with the lugs 80 formed on the hub or sleeve of the picker wheel 14.

By virtue of the construction described above, the operating means of which will be referred to later, the seed potatoes are fed uniformly into the seed bowl 30 from which they are picked up by the picker wheel 14.

After the prongs 20 on the arms 17 impale a piece of potato, the arms continue to rotate, in a clockwise direction as viewed in Figure 3, until a projecting lug 101, which is formed on each of the cams 21, is engaged by a spring trip 102 disposed in the path of movement of the lugs 101 and supported from the transverse frame member 5a. In the drawings, the cams 21 on the picker arms 17 are shown in the position they would assume when no seed potatoes have been placed in the hopper. It is to be understood, however, that in operation each of the arms shown in positions A, B, C, and D has a piece of potato disposed on the prongs 20 thereof and that the cam members 21 for the arms in these positions will be in their clockwise position relative to the arms. When the arms successively reach the position D, the lug 101 is approaching the spring trip member 102, and as soon as the lug 101 strikes the trip 102, the cam 21 is rotated counter-clockwise, causing the rounded projection 104 on the cam member 21 to trip the potato piece or seed off of the prongs. As each seed piece is thus discharged, it is deposited down a chute 105 supported from the transverse frame member 5a. Passing down the chute 105, the potato seed is deposited in a furrow formed by a furrow opener 110 which is supported by a vertically movable beam which will be referred to later.

Figure 5:
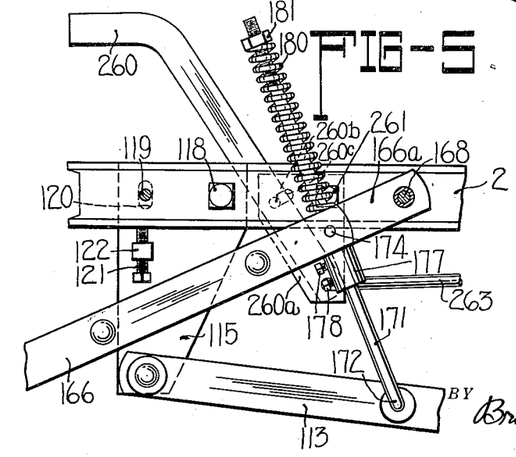
Figure 5 is an enlarged fragmentary view, illustrating the interconnection between the rear portions of the furrow opener supporting beams and the forward portion of the supporting bars for the rear covering wheels.
Figures 7, 8, 9, 10:
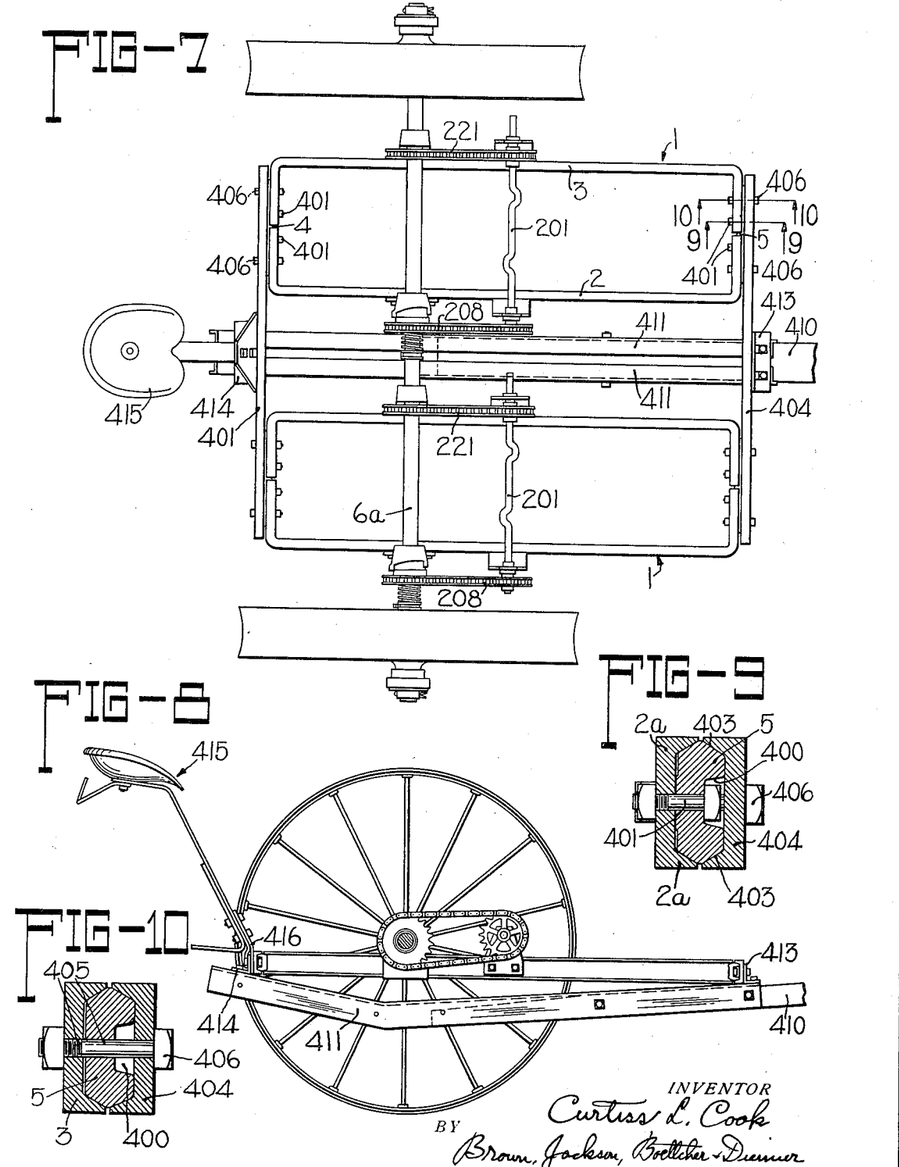
Figure 7 is a top plan view, showing the framework of an implement which is constructed of two frame units of the type best shown in Figure 2.
Figure 8 is a side elevation of the implement parts shown in Figure 7.
Figure 9 is a section taken along the line 9—9 of Figure 7.
Figure 10 is a section taken along the line 10—10 of Figure 7.

The furrow opener 110, which opens the furrow in which the seed potatoes are deposited in the manner just set forth, comprises a pair of plates 111 and 112 having downwardly and rearwardly inclined leading edges which are connected together to form a runner. The plates 111 and 112 diverge rearwardly, and the upper edges thereof are connected in any suitable manner to a tool beam in the form of a pair of rearwardly diverging beams or bars 113 and 114. The rear ends of the beams 113 and 114 are pivotally connected to a pair of depending brackets or supports 115 and 116 connected with and depending from the rear ends of the frame members 2 and 3, respectively, as best shown in Figures 1 and 3. The bracket 115 is connected to the frame member 2 for movement relative thereto in a general fore and aft direction. Specifically, the bracket 115 is pivoted to the beam 2 by means of a bolt 118, and the extent of pivotal movement is determined by a bolt 119 which extends through a perforation in the beam 2 and a slot 120 formed in the rear portion of the bracket 115, as best shown in Figure 5. The slot 120 provides for changing the angular position of the bracket 115 relative to the bolt 118, and by this means the lower end of the bracket 115, to which the rear end of the bar or beam 113 is connected, may be shifted in a fore and aft direction. The bracket 116 is similarly connected with the frame member 3, and shifting either or both of these brackets causes the furrow opener 110 to take different adjusted positions laterally of the supporting frame. To aid in retaining the bracket 115 in any position of adjustment, a set screw 121 is provided and is threaded through a lug 122 fixed to the side of the bracket 115 in a position to contact with the lower side of the frame member 2. The other bracket 116 is preferably also provided with such adjustment retaining means.

The furrow opener 110 is held at any operating depth, and is also raised to inoperative position, by means of a lever 130 pivotally connected, as at 131, to a bracket 132 extending laterally of, and supported from, the frame member 2. A notched sector 133 is provided for the lever and cooperates with a latch 134 on the lever to lock the lever in any desired position. The lower end of the lever is connected by means of a rod 135 to the lower end of an arm 136 provided on a rock shaft 137 journaled in perforations in brackets 138 and 139 bolted between transverse frame member 5a and longitudinal frame members 2 and 3, respectively. A forwardly extending arm 140 is fixed to the center of shaft 137. The forward end of arm 140 is bifurcated and embraces the upper end of a lifting rod 141. A pin 142 extends through perforations in the end of arm 140 and through a slot 143 provided in the upper end of the lifting rod 141. The lower end of the rod 141 is connected by means of a pivot 144 to the front end of the furrow opener 110. A compression spring 150 embraces the lifting rod 141 and is disposed between a washer 151 bearing against the under side of the arm 140, and against a plate 152 which in turn bears upon a shoulder 153 provided on the rod 141. By virtue of the provision of the compression spring 150 and the slot 143, the furrow opener is yieldingly held to the desired depth of operation, but should the furrow opener strike an obstruction it can rise upwardly against tension of the spring 150 within the limits of the slot 143.

A pair of covering disks 161 and 162 are provided at the rear of the planter for closing the furrow after the potatoes have been planted therein. These disks are mounted on a transverse bar 163 connected, as by means of castings 164 and 165 (Figure 2), to a pair of rearwardly extending beams 166 and 167 which are fixed at their forward ends to the arms 166a and 167a of a U-shaped member 170. The forward ends of arms 166a and 167a are pivotally connected to the sides of frame members 2 and 3 by means of bolts 168 and 169, respectively (Figure 1).

Covering disks 161 and 162 are raised and lowered simultaneously with the furrow opener 110 through connections between the beams 166 and 167 and the furrow opener beams 113 and 114, respectively. The connection of beam 166 with beam 113 comprises a rod 171 pivotally connected to the latter beam at 172, as best shown in Figures 4 and 5. The rod 171 extends through a sleeve 173 which is pivotally mounted by means of trunnions 174 between the beam 166 and the arm 166a, the forward end of beam 166 being offset laterally of arm 166a to provide space for sleeve 173, as best shown in Figure 2. The sleeve 173 normally rests upon a collar 177 fixed upon the rod 171 by means of adjusting screws 178. A compression spring 180 embraces the upper end of the rod 171 and bears against a nut 181 threaded upon the upper end of the rod and against the sleeve 173. The beam 167 is similarly connected with the beam 114.

Through these connections between the covering disks 161 and 162 and the furrow opener beams 113 and 114, the covering disks 161 and 162 and the furrow opener beams 113 and 114, the covering disks will be raised simultaneously with the furrow opener and will also be yieldingly held to a proper working depth relative to the depth at which the furrow opener is operated. The depth at which the covering disks operate relative to the depth at which the furrow opener is operated can be controlled by turning the nut 181. The position of points 172, at which the rods 171 are connected with the furrow opener beams, relative to the location of the sleeves 173 with respect to the pivot bolts 168 and 169 is such that the covering disks 161 and 162 will be raised to substantially the same height as the furrow opener.

The picking mechanism and the oscillating plates 85 and 86 are operated from a jack shaft 201 which is driven from the axle 6. The jack shaft 201 is journaled in bearings 202 and 203 which are supported in brackets 204 and 205 fixed to the sides of the frame members 2 and 3, respectively. The jack shaft 201 is driven from the axle 6 through a sprocket 206 mounted on the end of the shaft 201, a chain 207 and a sprocket 208 journaled on the axle 6 and adapted to be driven thereby through a clutch 209. The clutch 209 may be engaged or disengaged by a control member 210 which is adapted to be moved laterally on the axle 6 by an arm 211 on the member 210 engaging the cam surface 212 on the bearing 7. A third sprocket 215 of slightly different size than the sprocket 206 is journaled on a pin 216 provided on a bracket 217 supported from the bracket 204 to serve as a chain tightener. The bracket 217 is adjustably mounted and the pin 216 is made of the same diameter as jack shaft 201 so that sprockets 206 and 215 may be transposed to provide for different speeds of rotation of the jack shaft 201 to obtain different spacings of the seeds. The picking mechanism is operated from jack shaft 201 by means of a sprocket 220 mounted adjacent the left hand end of the jack shaft 201, a drive chain 221, and a sprocket 222 preferably, but not necessarily, cast integral with the sleeve 15, the drive chain 221 being trained over the sprockets 220 and 222, as indicated in Figure 2.

The vertically disposed plates 85 and 86, mounted on the walls 74 and 75 of the partition 73, are oscillated through connections with the jack shaft 201 which comprises a pair of pitmans 230 and 231 pivotally connected to the forwardly projecting ends of the plates, as best shown in Figures 3 and 4. The ends of the pitmans opposite their connections with the plates 85 and 86 are adjustably connected to split bearing boxes 232 journaled over crank portions 233 and 234 which are provided on the jack shaft 201, as best indicated in Figure 4. The furrow opener 110, together with the covering disks 161 and 162 can be raised and lowered by the means described above, including the hand lever 130, and after the furrow opener 110 and covering wheels have been raised to their inoperative position, it is desirable to discontinue the operation of the seed selecting and depositing means. To this end, therefore, mechanism has been provided for automatically disconnecting the clutch 209 whenever the furrow opener 110 is raised. This mechanism comprises a sleeve 240 (Figure 4) journaled upon the rock shaft 137 and having a crank arm 241 formed integral therewith. The crank arm 241 is connected by means of a link 242 to a lever 243 pivotally supported at 244 to the inner side of frame member 2. The lever 243 is connected by means of a link 245 (Figures 1 and 2) to the arm 211 of the clutch control member 210. The sleeve 240 has a lug 250 formed integral therewith which carries an adjusting bolt 251, the head of which is adapted to be contacted by the upper side of the arm 140 when the latter is swung upwardly for raising the furrow opener to inoperative position. The bolt 251 being contacted by arm 140 causes sleeve 240 to be rotated to actuate the control member 210 to disconnect the clutch whenever the furrow opener is in its inoperative position.

A foot lever 260 (Figure 1) has also been provided for manually disconnecting the clutch. This foot lever is pivotally connected to a bracket 260a (Figure 5) which is, in turn, pivoted to the side of the frame member 2, as at 261, and the lower end of the bracket 260a is connected by means of a link 263 to the lower end 264 (Figure 1) of the lever 243. The rear end of the link 263 is bent laterally for connection with the bracket 260a and also provides the pivot for connecting lever 260 with the bracket. The foot lever 260 is provided with a lug 260b which extends into a slot 260c in the upper portion of bracket 260a. This provides for limited lost motion between bracket 260a and the lever 260 for the purpose of safeguarding the operator from getting his foot pinched between the end of the lever 260 and the frame when the furrow opener 110 is raised by the hand lever 130.

A fertilizer distributer attachment has also been designed for the machine to be positioned in the most favorable location with respect to the point at which the fertilizer is to be deposited. The fertilizer distributing means is mounted in such a position that the fertilizer can be dropped vertically into the furrows formed for its reception. This is of particular advantage in that a more even distribution of fertilizer is obtained. Whenever fertilizer is led through conduits that are inclined or have curves therein, the fertilizer occasionally collects in the tube and then later releases itself, causing the fertilizer to be deposited unevenly. The fertilizer attachment comprises a main frame casting 301 (Figure 6) having two circular bowls 302 and 303 therein in the bottom of which fertilizer feed plates 304 are positioned. The casting member 301 is supported on the planter frame by means of two brackets 307 and 308 bolted to the under side of the member 301 by means of bolts 309 and to the sides of frame members 2 and 3, respectively, by means of bolts 310. A fertilizer hopper 315 is mounted over the frame member 301 and is connected thereto by means of bolts 316.

The fertilizer feed plates 304 are journaled upon tapered spindles 320 extending upwardly from the center of the bowls 302 and 303 and are rotated by means of a counter shaft 321 journaled in bearings 322 supported from the lower side of the frame member 301. Each feed plate 304 has bevel gear teeth formed on its lower side which engage with bevel pinions fixed to shaft 321. The shaft 321 is driven from the jack shaft 201 by means of a sprocket 330 mounted on the end of the shaft 201, a chain 331, and a sprocket 332 mounted on the end of shaft 321. An outlet 340 is formed integral with the front side of each of the bowls 302 and 303. A vertically disposed tube 341 is connected and supported by means of a flexible connection 342 connected to the lower end of each outlet 340. Rotation of the feed plates 304 and 305 feeds fertilizer through the outlets 340 into the tubes 341, which conduct the fertilizer into furrows formed by a pair of disk furrow openers 350 and 351.

The disks 350 and 351 are journaled on brackets 352 and 353 supported on a V-shaped beam 354, the arms 354a and 354b of which diverge rearwardly and are pivotally connected at their rear ends by means of pivot bolts 355 and 356 to the sides of the beams 113 and 114, respectively. The disks 350 and 351 are yieldingly held in operating position, and are raised to an inoperative position by means of connections between the arms 354a and 354b, the plate 152 associated with the lifting rod 141 for the furrow opener 110, as described above. These connections comprise links 358 and 359 pivotally connected with arms 354a and 354b and extending through perforations in the plate 152. The upper ends of the links 358 and 359 are threaded and each is provided with nuts 360 on the upper and the lower side of the plate 152 through the agency of which the position of the disks 350 and 351 relative to the furrow opener 110 may be adjusted.

To prevent bridging of the fertilizer in the hopper between the two bowls 302 and 303 an oscillating agitator is provided. This agitator comprises an inverted U-shaped member 370 one arm of which is pivoted in a journal bracket 371 and the other arm of which extends through perforations in the rear wall of the frame casting 301. The end 372 of the latter arm is bent laterally at right angles and is connected by means of a link 373 with a member 232a forming a part of the bearing box 232 mounted on the crank portion 233 of jack shaft 201. The member 232a of the bearing 232 is provided with a perforated lug for receiving the lower bent end of link 373.

A rotatable agitator 380 is also provided in each bowl 302 and 303. This agitator comprises an arm having one end bent upwardly and the other end bent upwardly and then downwardly. Each agitator 380 is loosely mounted upon a bolt 383 carried by the vertical spindle 320. A compression spring 385 embraces bolt 383 and has frictional contact with the top surface of a plate member 386 journaled over the spindle 320 and interengaging with the feed plate 304 to rotate therewith. The upper end of spring 385 is disposed in a cup 387 bearing against the under side of agitator 380. The agitator 380 is rotated through the frictional contacts between the lower end of spring 385 and the upper surface of plate 386, the upper end of spring 385 and cup 387, and the frictional contact between cup 387 and the under side of arm 380.

Draft is applied to the planter by means of a pole 390 which is connected by bolts 391 at its rear end to channels 392 the rear ends of which are spaced apart laterally. Bolts 393 and blocks 394 serve to connect the rear ends of the channels 392 to the frame bars 2 and 3, as best shown in Figure 2.

The agricultural implement so far as has been described comprises a single row machine mounted on a supporting frame 1 comprising the generally longitudinally disposed frame channel members 2 and 3 connected together at their front and rear bent ends in the manner best shown in Figure 2. In some cases it is desirable to construct a multiple row machine capable of planting more than one row, and to this end a feature of the frame construction, embodying the principles of the present invention, is that two single row planter units, including the frames 1 of each, can readily be connected together to form a two-row unit as is shown in Figures 7, 8, 9, and 10. The blocks 4 and 5 are shaped to engage in between the flanges 2a of the frame members 2 and 3 and have recesses 400 to receive the heads of bolts 401 by which the blocks are connected to the two frame members 2 and 3. The blocks 4 and 5 are also formed to project outwardly beyond the width of the flanges 402 on the frame members 2 and 3 and have beveled edges 403 to adapt them to be received between the flanges of a connecting transverse channel member 404.

To construct a two-row machine from two one-row units, the two frames are connected together by means of a member 404 at each end. Holes 405 are provided in the blocks 4 and 5 and in the members 2 and 3 to receive bolts 406 for the purpose of rigidly fastening the members 404 in position. Because of the recesses 400, the bolts 401 need not be disturbed. A single through-axle 6a is substituted for the two individual axles 6 of the two one-row units. By reason of the interengagement of the blocks 4 and 5 with the members 2 and 3 of the frame of the two units and with the connecting member 404, a very rigid frame results and little or no bending stress is applied to the center of the axle 6a. A pole 410, somewhat longer than the pole 390, is fastened between two angle irons 411 and 412 supported by a pair of brackets 413 and 414 from the transverse channel members 404. A seat 415 may also be supported from the rear member 404 by a bracket 416.

While I have shown and described above the preferred construction in which the principles of the present invention have been embodied, it is to be understood that my invention is not to be limited to the specific details shown and described above, but that, in fact, widely different means may be employed in the practice of the broader aspects of my invention.

What I claim, therefore, and desire to secure by Letters Patent is:

1. In a potato planter, seed selecting mechanism including a seed bowl and a picker wheel rotatable therein, a hopper disposed directly over said bowl and including oscillatory inclined plates forming a wall thereof, and means carried by said picker wheel and engageable with said inclined hopper plates for oscillating the latter.

2. In a potato planter, seed selecting mechanism including a seed bowl comprising separated sections and a picker wheel rotated between said sections, a hopper disposed substantially directly above said bowl and including a pair of oscillatory inclined plates forming a wall of the hopper and spaced one on each side of said picker wheel and disposed adjacent the axis of rotation of the latter, and means carried by said picker wheel and directly engageable with said spaced plates for oscillating the latter.

3. In a potato planter, seed selecting mechanism including a rotatable picker wheel disposed in a generally vertical plane, a hopper disposed above said wheel and including a divided lower section having portions disposed on opposite sides of said wheel and a central wall disposed above said wheel, a pair of oscillatory inclined plates one disposed in and forming a wall of each of said portions and disposed alongside said wheel, and means for oscillating said inclined plates.

4. In a potato planter, seed selecting mechanism including a seed bowl and a generally vertically disposed picker wheel rotatable therein, a hopper disposed above said bowl and including lower separated sections, one disposed on each side of said picker wheel, a pair of oscillatory plates forming at least a portion of the laterally inner wall of each of said hopper sections and disposed adjacent the picker wheel on opposite sides thereof, and means actuated when said picker wheel is driven for oscillating said plates.

5. In a potato planter, a supporting frame, seed selecting mechanism including a seed bowl carried by said frame and a picker wheel rotatable therein, a hopper disposed substantially directly above said bowl and including lower separated sections disposed on opposite sides of said picker wheel, a pair of oscillatory plates carried by the inner wall of each of said lower hopper sections and mounted for movement in a vertical plane for feeding material toward said seed bowl, means including a transverse shaft journaled on said frame for driving said picker wheel, and means actuated by said shaft for oscillating said plates.

6. In a potato planter, seed selecting mechanism including a seed bowl and a picker wheel rotatable therein, a hopper disposed above said bowl and including a generally vertically disposed wall adjacent said picker wheel, an oscillatory plate mounted on said generally vertically disposed wall and oscillatable for feeding material toward said seed bowl, pivot means for said oscillatory plate including spring means urging the latter against said wall, and means for oscillating said plate.

7. In a potato planter, seed selecting mechanism including a seed bowl and a picker wheel rotatable therein, a hopper disposed above said bowl and including a generally vertical wall disposed alongside said picker wheel, an oscillatory plate mounted adjacent said wall and shiftable in a vertical plane for feeding material toward said seed bowl, pivot means for said oscillatory plate including a transversely disposed member having one end carried by said vertical wall and the other end carried by said seed bowl, spring means encircling said pivot and serving to urge said oscillatory plate against said generally vertical hopper wall, means for driving said picker wheel including a transverse shaft, and means connected with said shaft for oscillating said plate.

8. In a potato planter, seed selecting mechanism including a seed bowl and a picker wheel rotatable therein, a hopper disposed above said bowl and including a generally vertically disposed wall adjacent said picker wheel, an oscillatory plate mounted on said generally vertically disposed wall and oscillatable for feeding material toward said seed bowl, means including a transverse shaft for oscillating said oscillatory member, and a second oscillatory plate movably mounted in said hopper and operatively connected to be driven by said picker wheel.

9. In a potato planter, a main supporting frame, seed selecting mechanism including a seed bowl and a picker wheel rotatable in the central portion thereof, a hopper disposed directly above said bowl and including laterally spaced sections embracing the upper portion of said picker wheel, each of said sections having a substantially vertical wall disposed alongside said picker wheel, means for driving the latter including a transverse shaft journaled for rotation on said frame, said shaft having crank portions, laterally spaced vertically disposed oscillatory plates pivoted to said vertical hopper wall sections, and means serving as laterally spaced pitmans operatively connected with said crank portions of the crank shaft and pivotally connected with said oscillatory plates, whereby rotation of said shaft oscillates said vertical plates.

10. In a potato planter, seed selecting mechanism including a seed bowl and a picker wheel rotatable therein, a hopper disposed directly above said bowl and including an oscillatory plate forming a wall thereof and extending alongside said wheel, and means on said picker wheel adapted to engage said plate periodically during the rotation of the picker wheel for oscillating said plate.

11. In a potato planter, a seed selecting mechanism including a seed bowl and a picker wheel member rotatable therein, a hopper disposed above said bowl and including an oscillatory plate member forming a wall of the hopper and extending alongside said picker wheel member, and means on one of said members serving as a lug and adapted to engage the other member for periodically oscillating said plate member during the rotation of the picker wheel member.

12. In a potato planter, seed selecting mechanism including a two-part seed bowl and a generally vertically disposed picker wheel rotatable between the parts of said bowl, a hopper mounted on said bowl and including a central wall partition embracing the upper portions of said picker wheel and serving to divide the lower portion of the hopper into two sections disposed on opposite sides of said picker wheel, a pair of oscillatory plates carried by the hopper, one on each side of said wheel and each forming a wall of the associated hopper section, each of said plates terminating in an end disposed in said seed bowl, and means actuated when said picker wheel is rotated for oscillating said plates to feed material from said hopper into each of said bowl sections.

13. In a potato planter, a seed selecting mechanism including a two-part seed bowl and a generally vertically disposed picker wheel rotatable between the parts of said bowl, a hopper disposed above and communicating with said bowl, said hopper including a central wall partition embracing the upper portion of said picker wheel, a pair of oscillatory inclined plates carried by the hopper, one on each side of said wheel and each forming a wall of the hopper, a pair of baffle plates carried by the hopper and inclined oppositely to and extending to a point adjacent said oscillatory plates, and means actuated when said picker wheel is rotated for driving said oscillatory plates to feed material from said hopper into each of said bowl sections.

14. In a potato planter, seed selecting mechanism including a two-part seed bowl and a generally vertically disposed picker wheel rotatable between the parts of said bowl, a hopper mounted on said bowl and including a central partition embracing the upper portions of said picker wheel and serving to divide the lower portion of the hopper into two sections disposed on opposite sides of the picker wheel, one wall of said hopper being inclined in a direction extending toward the latter, a pair of oscillatory plates carried by the hopper, one on each side of said wheel, a pair of baffle plates mounted on the interior of said hopper and of a wall opposite said inclined wall, said baffle plates being inclined downwardly in a direction generally toward said picker wheel and disposed alongside said oscillatory plates, and means actuated when said picker wheel is rotated for driving said oscillatory plates to feed material from said hopper into each of said bowl sections.

15. In a potato planter, seed selecting mechanism including a seed bowl and a generally vertically disposed picker wheel, a hopper disposed above said bowl and on opposite sides of said wheel, a pair of oscillatory plates carried by said hopper in planes generally at right angles to the plane of rotation of said picker wheel, one on each side of said picker wheel and each serving as a wall of the associated portion of the hopper, and means on the hub of the picker wheel for shifting said plates toward and away from the axis of rotation of said picker wheel.

16. In a potato planter, seed selecting mechanism including a seed bowl and a generally vertically disposed picker wheel rotatable therein, a hopper disposed above said bowl and including lower separated sections, one disposed on each side of said picker wheel, a pair of oscillatory plates mounted for movement in a substantially vertical plane on the laterally inner wall of each of said lower hopper sections, and means for simultaneously oscillating both of said plates.

17. In a potato planter, seed selecting mechanism including a seed bowl and a generally vertically disposed picker wheel rotatable therein, a hopper disposed above said bowl and including lower separated sections, one disposed on each side of said picker wheel, a pair of oscillatory plates mounted for substantially vertical movement on the laterally inner wall of each of said lower hopper sections, pivot means supporting said plates for oscillatory movement in a generally vertical direction, and means actuated when the picker wheel is rotated for oscillating said plates.

18. In a potato planter, a main frame, seed selecting mechanism carried by said frame and including a seed bowl and a rotatable picker wheel, a hopper carried on said main frame and disposed directly over said bowl, said hopper including lower laterally spaced separated sections embracing the upper portions of said picker wheel and having laterally inner vertical walls disposed on opposite sides of said picker wheel, a vertically disposed oscillatory plate mounted for movement relative to each of said vertical walls for the purpose of feeding material into said seed bowl, and means for oscillating said plates.

19. In a potato planter, a main frame, seed selecting mechanism carried by said frame and includnig a seed bowl and a rotatable picker wheel, a hopper carried on said main frame and disposed directly over said bowl, said hopper including lower laterally spaced separated sections embracing the upper portions of said picker wheel and having laterally inner vertical walls disposed on opposite sides of said picker wheel, an oscillatory plate mounted for movement relative to each of said vertical walls for the purpose of feeding material into said seed bowl, and a transverse shaft on said frame connected to drive both said picker wheel and said oscillatory plates.

20. In a potato planter, seed selecting mechanism including a seed bowl and a picker wheel rotatable therein, a hopper disposed directly over said bowl and including a vertical wall section embracing said picker wheel, an oscillatory plate pivotally mounted on each side of said vertical wall section and oscillatable for feeding material toward said seed bowl, a transverse crank shaft journaled for rotation relative to said hopper, and means connecting said crank shaft and said oscillatory plates, thereby providing for the oscillation of said plates when said shaft is rotated.

21. In a potato planter, seed selecting mechanism including a seed bowl and a picker wheel rotatable therein, a hopper disposed above said bowl and including a generally vertically disposed wall adjacent said picker wheel, an oscillatory plate mounted on said generally vertically disposed wall and oscillatable for feeding material toward said seed bowl, means including a transverse shaft for oscillating said oscillating member, and a second plate forming at least a portion of the bottom of the hopper and oscillatable alongside said first plate for feeding seed pieces into said bowl.

22. A potato planter comprising seed selecting mechanism including a seed bowl and a picker wheel rotatable therein, a hopper disposed directly above said bowl and including a shiftable plate forming a downwardly sloping bottom wall thereof and extending alongside said wheel into the rear portion of said seed bowl, and means on said picker wheel adapted to engage said plate periodically during the rotation of the picker wheel for agitating said plate.

23. A potato planter comprising seed selecting mechanism including a seed bowl and a picker wheel rotatable therein, means on the picker wheel movable into a portion of the bowl to select seed pieces therein, a hopper disposed directly above said bowl and including a shiftable plate forming a bottom wall thereof that slopes downwardly alongside said wheel to a point adjacent said portion of the seed bowl, and means on said picker wheel adapted to engage said plate periodically during the rotation of the picker wheel for agitating said plate.

24. In a potato planter, seed selecting mechanism including a seed bowl and a generally vertically disposed picker wheel rotatable therein, a hopper disposed above said bowl and including lower separated sections, one disposed on each side of said picker wheel, a pair of shiftable plates mounted for movement in a substantially vertical plane on the laterally inner wall of each of said lower hopper sections, and means for shifting said plates back and forth to agitate the seed pieces in said hopper sections.

CURTISS L. COOK.